United States Patent Office 3,454,863
Patented July 8, 1969

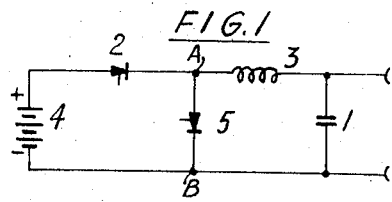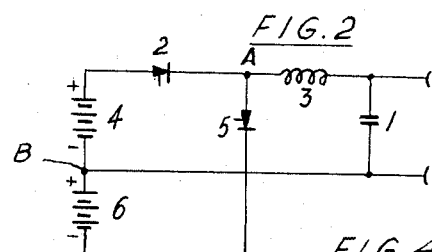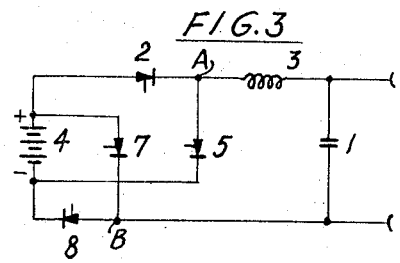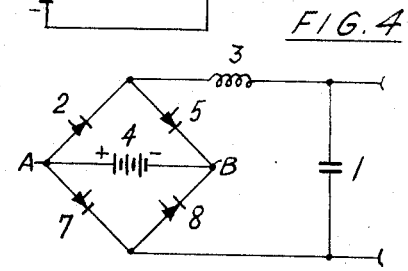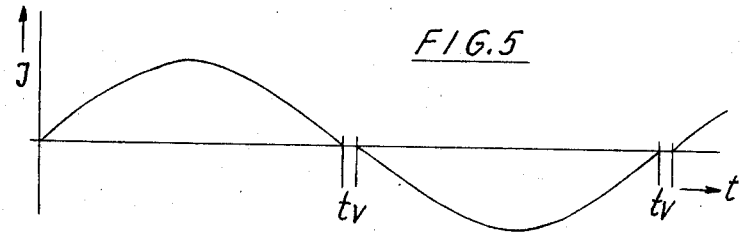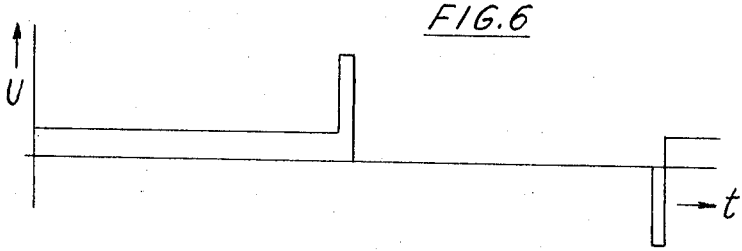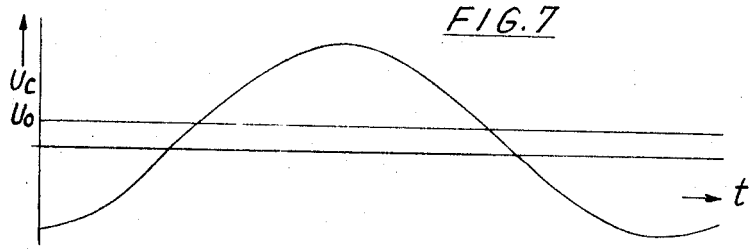

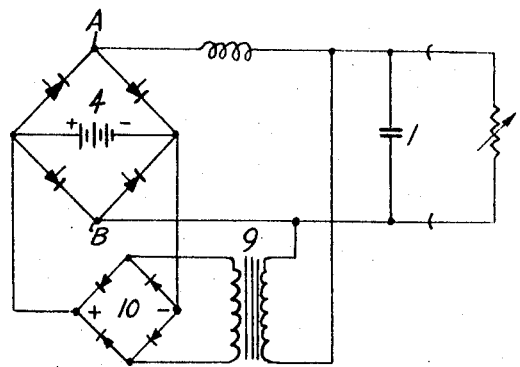
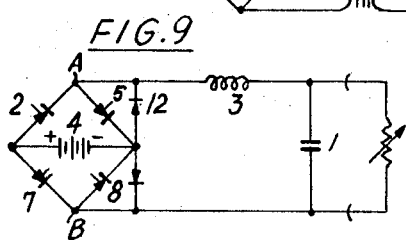
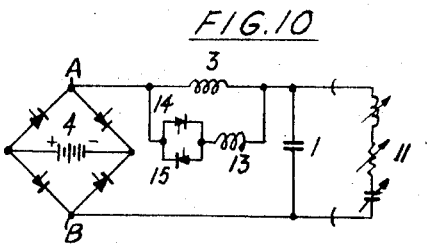
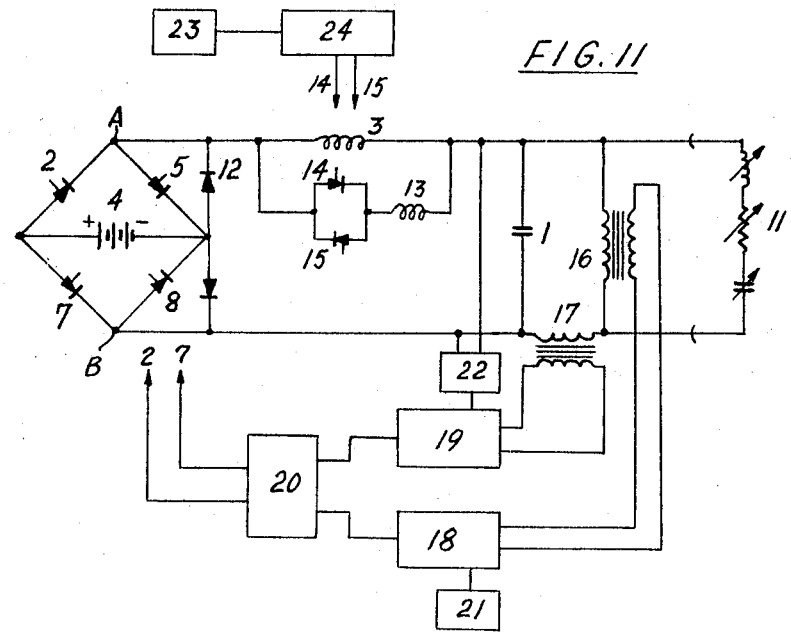

3,454,863
STATIC INVERTER COMPRISING A RESONANT CIRCUIT FOR GENERATING A CONSTANT OUTPUT VOLTAGE AND FREQUENCY
Harald Hintz, 1b Rawestrasse, and Werner Deleroi, 3 Muhlenweg, both of Runingen, Germany
Filed June 23, 1966, Ser. No. 559,939
Claims priority, application Germany, June 26, 1965, J 28,455; Oct. 2, 1965, J 29,113
Int. Cl. H02m 7/46
U.S. Cl. 321—44                        7 Claims

ABSTRACT OF THE DISCLOSURE

This provides a method of converting a direct current input voltage to a sinusoidal alternating current output voltage in a static resonant inverter. The method is accomplished by a controlled sequential charging and discharging of the capacitor by way of thyristors and a resonant circuit. The resonant circuit consists of a single inductance and a single capacitor working in conjunction with a charging thyristor means and a discharging thyristor means.

Background of the invention

For converting an electrical D.C. voltage into an alternating current voltage rotary and static inverters are used. In static inverters the polarity of the D.C. input voltage is reversed by mechanical or electronic switch means at the rate of the desired A.C. frequency and an A.C. output voltage of rectangular wave shape is thus obtained.

However, for numerous applications a sinusoidal A.C. output voltage is needed. In such a case the rectangular voltage obtained by periodic switching must first be converted to a sinusoidal A.C. voltage, necessitating the provision of complicated and expensive equipment. In methods conventionally used in the art several sequentially operated switch means are used for first generating an output voltage of stepped conformation, the harmonics content of this output voltage being removed in filter elements. According to the complexity of the filter train an A.C. voltage is thus obtained which more or less approximates the sine shape that is desired.

The drawback of this method is the considerable number of components and elements needed for first generating the step-shaped voltage and then reducing the same to a sine wave in filters. The application to the necessary transformers and reactance coils of a rectangular voltage, i.e. a voltage with a high harmonic distortion, increases the power loss due to remagnetisation and the generation of eddy currents in these switch members so that high efficiencies cannot be achieved with inverters of such a kind.

Summary of the invention

The present invention considerably improves the design of a static inverter in which the expenditure in technical means is greatly reduced for generating a sinusoidal A.C. voltage with a coefficient of non-linear distortion that is less than 3%. The direct generation of a sinusoidal voltage also reduces the iron loss since only one reactance coil need be provided. The proposed resonance inverter is capable of operating with a high degree of efficiency. By making use of the resonant amplification obtained in an oscillating resonant circuit an output A.C. voltage is generated which has an amplitude exceeding the voltage of the D.C. source of supply. In many applications the use of a transformer for transforming the output voltage to the desired voltage can thus be dispensed with because the required amplitude of the output voltage can be directly obtained by suitably designing the resonant circuit. The elimination of a transformer and of the power loss therein incurred further operates to improve the efficiency of the inverter.

According to the invention a capacitor is charged through an inductance from a D.C. voltage source by closing a mechanical or electronic switch means. The capacitor is charged by a damped sine wave which has an amplitude exceeding the voltage of the D.C. voltage source and a frequency determined substantially by the values of the inductance and the capacitance. If suitable steps are taken at the end of the first half wave to interrupt the sine wave charging the capacitor and then to discharge the capacitor likewise in the form of a damped sine wave by closing a second mechanical or electronic switch, then the continuously repeated operation of both switches will provide a stationary sinusoidal A.C. output voltage at the terminals of the capacitor.

A similar arrangement is already known wherein despite the appearance of a rectangular voltage in the output of an inverter circuit a sinusoidal current can be generated in a predominantly inductive load by combining this load with a capacitor to form a series resonant circuit.

In contradistinction thereto the present invention generates a sinusoidal voltage in the output of the resonance inverter irrespectively of the nature of the load.

Another advantage of the proposed resonance inverter over known D.C. chopper circuits is that because of the generation of sinusoidal oscillations the current through the switches briefly becomes zero. Controlled silicon rectifiers which are nowadays generally used as switch means or gates will therefore automatically cease to conduct at the end of the first half cycle of the charging and discharging oscillation. Compared with conventional inverter circuits in which the rectifiers are positively commutated, a number of expensive switching elements can thus be saved.

Brief description of drawings

FIG. 1 is a circuit diagram showing the basic resonant circuit according to the invention.

FIGS. 2, 3 and 4 are circuit diagrams showing the basic resonant circuit of the invention using various means of amplifying the resonant inverter circuit.

FIG. 5 is a diagrammatic representation of current flowing through the controlled rectifiers of the resonant circuit of this invention.

FIG. 6 is a diagrammatic representation of the voltage drop across the rectifiers in the resonant circuit of this invention.

FIG. 7 is a diagrammatic representation of the shape of the alternating current voltage across the capacitor 1 in the resonant circuit of this invention.

FIGS. 8, 9, 10 and 11 show circuit diagrams of other embodiments incorporated in the resonant circuit of this invention.

Description of specific embodiments

The reference numeral 1 denotes a capacitor which is charged in the form of a damped sine wave through an inductance 3 from a D.C. voltage source 4 (a battery in the drawing) as soon as a controlled silicon rectifier (thyristor) 2 fires. At the end of the first half wave of this charging oscillation the current passes through zero in the series resonant circuit formed by 1 and 3. Hence the controlled rectifier 2 ceases to conduct and further charging of the capacitor from the battery is interrupted. As the current passes through zero a trigger pulse can be obtained for firing a second controlled rectifier 5. The energy stored in the capacitor 1 is therefore reconverted into a sine wave through the inductance 3. When the current passes through zero at the end of the first half wave of the discharging oscillation the controlled rectifier 5 ceases to conduct and a trigger pulse obtained at this instant is applied to the first controlled rectifier 2 which fires and initiates the recharging of the capacitor 1 by the D.C. voltage source 4. A sinusoidal A.C. voltage will therefore appear across the terminals of the capacitor 1 and the frequency will be substantially determined by the resonant frequency of the series resonant circuit constituted by the capacitor 1 and the inductance 3.

The current flowing through the controlled rectifiers 2 and 5 when conditions have become stationary are diagrammatically represented in FIG. 5. It will be seen that at the end of the first half wave of the charging oscillation the current through the rectifier 2 passes through zero. The rectifier therefore ceases to conduct and the voltage illustrated in FIG. 6 across the rectifier 2 collapses. The voltage peak which occurs when the current is abruptly cut off is measured and then used for striking the controlled rectifier 5 for discharge.

A certain period of time, known as the deionisation time, elapses before a siliocn rectifier will completely block. The striking of the second controlled rectifier 5 must therefore be delayed for at least this period. In FIG. 5 this period of delay is indicated by $t_v$. This delay prevents the rectifier 2 from restriking when the second rectifier 5 begins to conduct and thus obviates short-circuiting of the D.C. voltage source 4 through the two rectifiers 2 and 5. The necessary delay time $t_v$ which may amount to between 30 and 60 $\mu$secs. is so short in relation to the normal oscillation period of the A.C. in medium frequency applications that it will not significantly affect the shape of the current and voltage. At the end of the negative half wave of the current through the rectifier 5 the latter will block and the resultant voltage peak due to the interruption of the current is then used to restrike the first controlled rectifier 2 after a given period of delay $t_v$ so that recharging of the capacitor 1 will recommence.

The shape of the A.C. voltage $U_C$ at the capacitor 1 is shown again in FIG. 7 on the same time scale as in FIGS. 5 and 6. It will be understood that the amplitude of this A.C. voltage exceeds the voltage $U_B$ supplied by the D.C. voltage source.

However, the A.C. voltage generated by the above-described method has a D.C. voltage component equal to half the battery voltage, and in many applications this would not be desirable. It can however be eliminated by amplifying the resonant inverter circuit in the manner illustrated in FIGS. 2, 3 and 4.

In FIG. 2 the capacitor 1 is charged by an oscillation in the same way as in FIG. 1 from a D.C. voltage source 4 through a rectifier 2 and an inductance 3. However, the discharge of the capacitor through the inductance 3 and the second rectifier 5 is not to be negative pole of the D.C. voltage source 4 as a reference voltage A, but to the negative potential of a supplementary D.C. voltage source 6 which has the same voltage as the voltage source 4. This eliminates the D.C. voltage component from the A.C. voltage appearing across the terminals of the capacitor 1.

The additional D.C. voltage source 6 required for discharging the capacitor 1 to a negative potential can be avoided if, as shown in FIG. 3, the polarity of the D.C. voltage source 4 is reversed by two further rectifiers operating in synchronism with the opening of the charging and discharging rectifiers 2 and 5.

In this instance the charging of the capacitor 1 is initiated by simultaneously opening the rectifier 2 and a rectifier 8 which again become non-conductive at the end of the first half wave of the charging oscillation as the current passes through zero. The capacitor 1 is discharged through the inductance 3 via the rectifier 5 and a rectifier 7 which open simultaneously. Consequently, the reference A is connected to the negative pole of the source of voltage during the charging period and to the positive pole during the discharging period. The capacitor discharge is therefore to a negative potential, as in FIG. 2, and the A.C. output voltage is not superposed by a D.C. voltage component.

FIG. 4 represents exactly the same circuit as that in FIG. 3, and merely shows that the rectifiers form a bridge.

When such an inverter works into a load the resonant circuit will be damped and the amplitude as well as to some extent the frequency of the A.C. voltage will change accordingly. This limits the applicability of the free-running resonance inverter to a number of special cases.

However, according to a further development of the invention, these drawbacks can be overcome and the applicability of the proposed resonance inverter appreciably widened by providing in a suitable way an automatically maintained constant degree of damping in the resonant circuit, irrespectively of the nature of the external load. This can be done by feedback of the energy of the resonant circuit into an energy storage means such as the battery, feedback being increased in proportion to a drop in the external load.

Moreover, the supply of electrical power from a D.C. voltage source can be so controlled that despite a varying degree of damping in the resonant circuit caused by changes in the load a constant amplitude oscillation will always be maintained. For instance, the supply from the D.C. voltage source may be delayed for a time after the current of the resonant oscillation has passed through zero, in such a way that power is supplied only during a continuously variable part of the A.C. cycle.

According to another feature of the invention, the frequency of the inverter can be made independent of the magnitude and power factor, i.e. upon the ratio of the effective to the reactive power, of the load by varying the reactances in the resonant circuit in the inverter which determine the frequency, in such a way that with due regard to the reactive components of the load the period of the oscillation in the resonant circuit continues to be that of the required A.C. output frequency of the inverter.

These features will be illustratively described by reference to three further embodiments shown in FIGS. 8, 9 and 10:

In FIG. 8 a sinusoidal A.C. voltage with a low coefficient of non-linear distortion will appear in the inverer output across the terminals of the capacitor 1. Connected in parallel to the capacitor 1 is a transformer 9. The transformation ratio of this transformer determines the magnitude of the output voltage because the appearance across the transformer secondary of a peak voltage exceeding the voltage of the voltage source 4 will drive a current through a rectifier bridge 10 comprising four diodes, which feeds back to the source of voltage the rectified A.C. voltage energy extracted from the transformer. Similarly, should energy feed back from the load to the generator this energy will be returned to the source of voltage in the same way.

When the external load across the capacitor 1 diminishes, the inverter output voltage will rise and the feedback current will become greater. Any change in the external load will therefore change the load constituted by the transformer in the contrary direction owing to the proportionate change in feedback energy, and since the damping factor of the resonant circuit will thus remain constant the output voltage across the capacitor 1 will likewise remain constant.

An alternative method of keeping the A.C. output voltage constant is illustrated in FIG. 9. In this instance the controlled supply of electrical energy from the voltage source 4 through a resonant circuit formed by the capacitor 1 and the inductance 3 to a load 11 connected across the capacitor 1 is limited to allow for any variations in the magnitude of the load by appropriately delaying the initiation of power supply after the current of the resonant oscillation has passed through zero instead of continuing the supply throughout the full cycle. The limitation of the power supply to a continuously adjustable part of the A.C. cycle is so controlled that the amplitude of the A.C. voltage across the capacitor 1 will always remain constant.

Let it be assumed that under otherwise stable operating conditions the rectifier 8 is opened at the end of a negative half wave of the A.C. voltage. The circuit comprising an inductance 3, the capacitor 1 which is shunted by the external load 11, and the rectifier 8 is thus completed through a diode 12. The voltage in the resonant circuit can therefore swing. At the end of an adjustable period of delay the rectifier 2 which by-passes the diode 12 with the interposition of the voltage source 4 is opened.

If the load fed by the inverter is not purely ohmic and contains both inductive and capacitive components, then these reactive components will detune the resonant circuit and hence change the inverter frequency. The frequency change due to the nature of the load can be compensated by a corresponding change in the values of the capacitor 1 and the inductance 3, but this presents difficulties because continuously variable inductances or capacitances are not known in the art that would be suitable for power application in heavy-current engineering. However, a quasi-continuous adjustment is possible by associating during part of the A.C. voltage cycle a fixed supplementary inductance or capacitance with the existing elements and by suitably varying the time of inclusion of these supplementary elements. Each cycle of the desired inverter frequency will then comprise two parts of different frequency. The frequency of one part of the cycle is determined by the resonant frequency prescribed by the inductance 3, the capacitor 1 and the reactance of the load 11.

The resonant frequency of the second part of the cycle will be determined by the inductance 3 and the supplementary inductance 13 which is now connected in parallel thereto, the capacitor 1 and the reactance of the load 11.

It is not practicable to connect a supplementary capacitance across the capacitor 1 because a heavy compensating current will flow when such a supplementary capacitance is switched into circuit and this will cause sudden changes in the output voltage which considerably increase non-linear distortion. The inclusion in parallel or series of a supplementary inductance is much better, since the current in the resonant circuit will not then abruptly rise on account of the time constant of the supplementary inductance and the slight current change that does occur will not significantly affect the output voltage.

In the embodiment according to FIG. 10 a supplementary inductance 13 is connected in series with controlled rectifiers 14 and 15 across the inductance 3 and this supplementary inductance is kept in circuit for a long or short period of time during each cycle of the inverter oscillation to compensate the reactive part of the load. For this purpose the instant of switching the supplementary inductance into circuit is varied, whereas the controlled rectifiers automatically become non-conductive when the current passes through zero. In order to provide control during both the positive and negative half cycle of the inverter oscillation, two controlled rectifiers are connected in anti-parallel.

If the amplitude of the output voltage of the inverter is compared with a required reference voltage, then this comparison will provide an error signal which permits the delay time for switching in the source of voltage to be varied and the inverter output voltage to be maintained at a value which is not dependent upon the load.

The measurement of the effective A.C. voltages for analogous regulation necessitates rectification followed by smoothing or filtering, in which case the time constant of the filter is a nuisance when the load changes abruptly. Since the resonance inverter may be regarded as constituting a very rapidly acting closed loop control circuit in which the output is composed entirely of transients, any change in the state of the load will affect the amplitude of the output voltage before this change has been measured and applied with delay to the control member.

If the load tends to fluctuate considerably the operating state of the resonance inverter will therefore be unstable, the amplitude of the output voltage continuously fluctuating and a stationary state will not be established.

However, according to the proposal of the invention the resonance inverter can be operated without trouble when sudden changes in the state of the load occur. Even when sudden changes in the load occur, say from idling to full power, the resultant voltage surges and excess amplitudes will remain within a few percent of the A.C. voltage amplitude and they will be controlled out in the course of a few half cycles of the inverter output voltage.

This nearly ideal behavior of the resonance inverter is achieved by controlling the amplitude not only by the usual generation by rectification and smoothing, of a voltage that is analogous to the effective voltage and comparing the same with a reference voltage but at the same time by measuring the reactitve component of the load current and using any change in this component as a further controlling factor for adjusting the amplitude of the inverter voltage. To this end the reactive component of the load current is read in the form of an analogous voltage when the A.C. output voltage passes through its positive and negative maxima, the value thus obtained being stored for a half cycle to the next reading. By comparing the frequency of the inverter output voltage with a reference frequency an error signal is obtained when the frequency deviates and this can be used for controlling the inverter to maintain a given constant frequency. However, similar instabilities as those which occur in the case of amplitude regulation must be expected to occur if the actual value is measured in a conventional manner by means of a demodulator for frequency-modulated signals, for instance by a ratio detector, since in such a case the measurement of actual value also contains a smoothing time constant.

In view of the nature of the entry transients of the resonant circuit a fixed prescribed frequency can be maintained if a fixed frequency timebase provides trigger pulses for firing the controlled rectifiers for frequency control. These controlled rectifiers will then strike at prescribed times and any change in the natural frequency of the inverter resonant circuit due to a change in the nature of the load is suppressed by the automatic variation of the firing periods of the controlled rectifiers for frequency control according to the period of the oscillation of the resonant circuit. The resultant inductance and, at constant capacitance, the period of the resonant oscillation will thus remain constant. FIG. 11 shows an embodiment of the invention representing a complete circuit illustrating the principle of a resonance inverter with amplitude and frequency control as proposed by the invention.

A voltage transformer 16 measures the amplitude of the A.C. voltage fed to the load 11. The A.C. voltage is rectified in a unit 18, smoothed and compared with a reference voltage supplied by a unit 21. The output signal delivered by the unit 18 controls the timing of the trigger pulses for firing the controlled rectifiers 8 and 5. The trigger pulses are generated in component 20.

The amplitude control so far described agrees with conventional methods which suffer from the drawbacks that arise from the presence of the time constant of the smoothing filters.

According to a further proposal of the invention a current transformer 17 and an electronic unit 19 are provided to secure quick control of amplitudes. The current transformer 17 supplies an A.C. voltage which is proportional to the load current, and which is rectified in the unit 19. A timing member 22 controls the measurement of the magnitude of the A.C. voltage which is proportional to the load current at the instants the A.C. output voltage passes through its maxima and minima in the form of a capacitor charge stored for the period of a half cycle. The output voltage of the unit 19 therefore has the form of a sequence of steps representing the changes of the load current and this is combined in the component 20 with the output signal from the unit 18 and thus directly enters into the control of the firing times of the controlled rectifiers 8 and 5.

The frequency control is effected with the aid of a constant frequency timebase 23 which generates voltage pulses applied to a unit 24. After having been suitably shaped, these pulses are used for firing the controlled rectifiers 14 and 15.

For adjustment to a desired frequency the inductances 3 and 13 are so designed that when working into an ohmic load the periodicity of the resonant oscillations corresponds to the desired inverter frequency when the supplementary inductance 13 is in circuit for half the period of the positive and negative half wave of the resonant oscillation. If, for example, the appearance of a reactive component in the load 11 changes the natural frequency of the resonant circuit, say by lowering the same, and increasing periodicity then the supplementary inductance will remain in circuit for a longer period whereas the firing pulses remain fixed. The apparent total inductivity is therefore less and the automatically resulting period of the resonant frequency again becomes equal to that of the desired output frequency of the inverter. Conversely, if the natural frequency becomes greater and the period of the resonant circuit lessens, the supplementary inductance remains in circuit for a shorter period of time during each half cycle of the resonant oscillation, whereas the timing of the firing pulses remains unchanged.

Since the resonant circuit adjusts itself to a different state of the load in each half cycle the automatic variation of the period of time during which the supplementary inductance 13 remains in circuit is so rapid that no variation of the frequency of the inverter output voltage can be observed.

The derivation and conversion of the control signals for operating the resonance inverter is performed in conventional electronic circuits generally known as monostable, bistable and astable multivibrators, Schmitt triggers and saw tooth generators.

We claim:

1. In a method of converting a direct current input voltage to a sinusoidal alternating current output voltage in a static resonance inverter by controlled sequential charging and discharging of a capacitor via thyristors and a resonant circuit, alternating current output voltage appearing continuously across the resonant circuit capacitor comprising, in combination therewith, the steps of
    (a) providing a charging thyristor means, a discharging thyristor means, and a resonant circuit consisting of a single inductance and a single capacitor,
    (b) firing the charging thyristor means to charge the resonant circuit capacitor,
    (c) stopping conduction of said charging thyristor means having a high potential produced across said charging thyristor means when said capacitor is fully charged to terminate the first half cycle of the charging oscillation,
    (d) firing the discharging thyristor means with said charging thyristor potential after a period of time sufficient to allow deionization of the charging thyristor means to discharge the resonant circuit with an oscillation through the resonant circuit inductance,
    (e) stopping conduction of said discharging thyristor means having a high potential produced across said discharging thyristor means when said capacitor is fully discharged and the current passes through zero to terminate a second half cycle of the alternating current oscillation, and
    (f) firing the charging thyristor means with said discharging thyristor potential after a period of time sufficient to allow deionization of the discharging thyristor means to charge the resonant circuit capacitor and to produce an output frequency dependent upon the self-oscillation of the resonant circuit, said firing and current conduction stoppage being continued to maintain a continuous oscillation.

2. In a method as defined in claim 1 further including the step of
    switching on the source of direct current supply at the end of the conduction stopping step to maintain an oscillation of constant amplitude on the resonant circuit capacitor,
    the current of the resonant circuit being conducted through diodes without inclusion of the direct current source during the said conduction stopping step.

3. In a method of converting a direct current input voltage to a sinusoidal alternating current output voltage in a static resonance inverted by controlled sequential charging and discharging of a capacitor via thyristors and a resonant circuit, alternating current output voltage appearing continuously across the resonant circuit capacitor comprising, in combination therewith, the steps of
    (a) providing a charging thyristor means consisting of a single thyristor, a discharging thyristor means consisting of a single thyristor, and a resonant circuit consisting of a single inductance and a single capacitor,
    (b) firing the charging thyristor means to charge the resonant circuit capacitor,
    (c) stopping conduction of said charging thyristor means when said capacitor is fully charged to terminate the first half cycle of the charging oscillation,
    (d) firing the discharging thyristor means after a period of time sufficient to allow deionization of the charging thyristor means to discharge the resonant circuit with an oscillation through the resonant circuit inductance,
    (e) stopping conduction of said discharging thyristor means when said capacitor is fully discharged and the current passes through zero to terminate a second half cycle of the alternating current oscillation,
    (f) firing the charging thyristor means after a period of time sufficient to allow deionization of the discharging thyristor means to charge the resonant circuit capacitor, said firing and current conduction stoppage being continued to maintain a continuous oscillation,
    (g) providing a supplementary inductance to vary the inductance in the resonant circuit of the inverter, and
    (h) providing thyristor means to switch on the supplementary inductance, and switching on said supplementary inductance to compensate for the reactive components of the load within each half cycle of the inverter oscillation to produce a semioscillation of the upward current composed of two partial oscillations having different frequencies.

4. In a method as defined in claim 3 wherein
    a constant frequency time base generates trigger impulses for the thyristors for switching on the said supplementary inductance so that the resulting upward frequencies maintain constant in correspondence to synchronization.

5. In a method of converting a direct current input voltage to a sinusoidal alternating current output voltage in a static resonance inverter by controlled sequential charging and discharging of a capacitor via thyristors and a resonant circuit, alternating current output voltage appearing continuously across the resonant circuit capacitor comprising, in combination therewith the steps of
    (a) providing a charging thyristor means, a discharging thyristor means, and a resonant circuit consisting of a single inductance and a single capacitor,
    (b) firing the charging thyristor means to charge the resonant circuit capacitor, (c) stopping conduction of said charging thyristor means when said capacitor is fully charged to terminate the first half cycle of the charging oscillation, (d) firing the discharging thyristor means after a period of time sufficient to allow deionization of the charging thyristor means to discharge the resonant circuit with an oscillation through the resonant circuit inductance, (e) stopping conduction of said discharging thyristor means when said capacitor is fully discharged and the current passes through zero to terminate a second half cycle of the alternating current oscillation, (f) firing the charging thyristor means after a period of time sufficient to allow deionization of the discharging thyristor means to charge the resonant circuit capacitor, said firing and current conduction stoppage being continued to maintain a continuous oscillation, (g) comparing amplitudes of the inverter output voltage with a reference voltage to produce a difference value which provides an analogous error signal without filtering, and (h) storing said signal until the next amplitude occurs to permit controlling the firing delay in an analogous manner such that the inverter upward voltage can be kept at the same constant value irrespectively of the load.

6. In a method of converting a direct current input voltage to a sinusoidal alternating current output voltage in a static resonance inverter by controlled sequential charging and discharging of a capacitor via thyristors and a resonant circuit, alternating current output voltage appearing continuously across the resonant circuit capacitor comprising, in combination therewith the steps of (a) providing a charging thyristor means, a discharging thyristor means, and a resonant circuit consisting of a single inductance and a single capacitor, (b) firing the charging thyristor means to charge the resonant circuit capacitor, (c) stopping conduction of said charging thyristor means when said capacitor is fully charged to terminate the first half cycle of the charging oscillation, (d) firing the discharging thyristor means after a period of time sufficient to allow deionization of the charging thyristor means to discharge the resonant circuit with an oscillation through the resonant circuit inductance, (e) stopping conduction of said discharging thyristor means when said capacitor is fully discharged and the current passes through zero to terminate a second half cycle of the alternating current oscillation, (f) firing the charging thyristor means after a period of time sufficient to allow deionization of the discharging thyristor means to charge the resonant circuit capacitor, said firing and current conduction stoppage being continued to maintain a continuous oscillation, (g) measuring the effective component of the load current, and (h) referring to its magnitude in addition to the adjustment of the firing delay to design the nature of the voltage when load jumps occur.

7. In a method of converting a direct current input voltage to a sinusoidal alternating current output voltage in a static resonance inverter by controlled sequential charging and discharging of a capacitor via thyristors and a resonant circuit, alternating current output voltage appearing continuously across the resonant circuit capacitor comprising, in combination therewith the steps of (a) providing a charging thyristor means, a discharging thyristor means, and a resonant circuit consisting of a single inductance and a single capacitor, (b) firing the charging thyristor means to charge the resonant circuit capacitor, (c) stopping conduction of said charging thyristor means when said capacitor is fully charged to terminate the first half cycle of the charging oscillation, (d) firing the discharging thyristor means after a period of time sufficient to allow deionization of the charging thyristor means to discharge the resonant circuit with an oscillation through the resonant circuit inductance, (e) stopping conduction of said discharging thyristor means when said capacitor is fully discharged and the current passes through zero to terminate a second half cycle of the alternating current oscillation, (f) firing the charging thyristor means after a period of time sufficient to allow deionization of the discharging thyristor means to charge the resonant circuit capacitor, said firing and current conduction stoppage being continued to maintain a continuous oscillation, (g) measuring the effective component of the rectified sinusoidal load current as an analogous voltage when the alternating current output voltage passes through its maxima and minima, and (h) storing the value thus obtained for the period of a half cycle until the next measurement is performed.

References Cited

UNITED STATES PATENTS

| | | | |
|---|---|---|---|
| 3,234,408 | 2/1966 | Camnitz | 307—108 |
| 3,259,829 | 7/1966 | Feth | 321—45 XR |
| 3,309,541 | 3/1967 | Baker | 307—108 XR |
| 3,316,476 | 4/1967 | Olson et al. | 321—45 |
| 3,325,720 | 6/1967 | Stumpe | 321—45 |
| 3,332,001 | 7/1967 | Schwartz | 320—1 XR |

JOHN F. COUCH, *Primary Examiner.*

W. M. SHOOP, JR., *Assistant Examiner.*

U.S. Cl. X.R.

307—108; 320—1; 321—45